(12) United States Patent
Winter et al.

(10) Patent No.: US 9,568,083 B2
(45) Date of Patent: Feb. 14, 2017

(54) INFINITELY-VARIABLE TRANSMISSION FOR A VEHICLE

(71) Applicant: TOROTRAK (DEVELOPMENT) LTD, Leyland Lancashire (GB)

(72) Inventors: Philip Winter, Blackburn Lancashire (GB); Christopher Greenwood, Llansantffraid Powys (GB)

(73) Assignee: Torotrak (Development) Ltd., Leyland Lancashire (GB)

( * ) Notice: Subject to any disclaimer, the term of this patent is extended or adjusted under 35 U.S.C. 154(b) by 1 day.

(21) Appl. No.: 14/420,520

(22) PCT Filed: Aug. 9, 2013

(86) PCT No.: PCT/EP2013/066738
§ 371 (c)(1),
(2) Date: Feb. 9, 2015

(87) PCT Pub. No.: WO2014/023832
PCT Pub. Date: Feb. 13, 2014

(65) Prior Publication Data
US 2015/0219194 A1    Aug. 6, 2015

(30) Foreign Application Priority Data
Aug. 10, 2012   (GB) .................................. 1214316.0

(51) Int. Cl.
*F16H 37/08*    (2006.01)
*F16H 15/38*    (2006.01)

(52) U.S. Cl.
CPC ..... *F16H 37/086* (2013.01); *F16H 2037/0886* (2013.01); *F16H 2037/0893* (2013.01); *F16H 2200/2005* (2013.01)

(58) Field of Classification Search
CPC ...... F16H 37/086; F16H 15/38; F16H 37/082; F16H 37/08
See application file for complete search history.

(56) References Cited

U.S. PATENT DOCUMENTS 4,624,153 A    11/1986   Itoh
6,045,477 A     4/2000   Schmidt
(Continued)

FOREIGN PATENT DOCUMENTS

EP    0905413 A1    3/1999
GB    2274315 A     7/1994
(Continued)

OTHER PUBLICATIONS

WO 2010/133873 A1 (Nov. 25, 2010)—Continuously Variable Ratio Transmission (WINTER).*
(Continued)

*Primary Examiner* — Jacob S Scott
*Assistant Examiner* — Tinh Dang
(74) *Attorney, Agent, or Firm* — The Dobrusin Law Firm, PC

(57) ABSTRACT

An infinitely-variable transmission system is disclosed. The system comprises an input shaft (10) and an output shaft (14). The transmission is operative to transmit rotational drive between the input shaft (10) and the output shaft (14). The transmission includes a variator (20) that can transmit drive at a continuously variable ratio between a minimum variator ratio and a maximum variator ratio. The transmission can operate a low-speed regime and in a high-speed regime. The transmission is operative in the low-speed regime, at a neutral low regime variator ratio, the transmission is in geared neutral, in which, the output of the transmission is stationary irrespective of the speed of the input of the transmission and at a maximum low regime (Continued)

variator ratio, the output of the transmission is driven from the input of the transmission at a maximum low-regime transmission ratio, In the high-speed regime, at a minimum high regime variator ratio, the output of the transmission is driven from the input of the transmission at a minimum high-regime ratio and at a maximum high regime variator ratio, the output of the transmission is driven from the input of the transmission at a maximum high-regime transmission ratio.

23 Claims, 10 Drawing Sheets

(56) References Cited

U.S. PATENT DOCUMENTS

| | | | |
|---|---|---|---|
| 6,059,685 A | 5/2000 | Hoge | |
| 6,063,002 A * | 5/2000 | Nobumoto | F16H 61/6648 477/41 |
| 6,171,210 B1 * | 1/2001 | Miyata | F16H 37/086 475/216 |
| 7,347,801 B2 * | 3/2008 | Guenter | F16H 37/086 475/216 |
| 7,407,459 B2 * | 8/2008 | Greenwood | F16H 37/086 475/215 |
| 2002/0187872 A1 | 12/2002 | Wehking | |
| 2004/0198549 A1 * | 10/2004 | Wafzig | B60K 17/3462 476/39 |
| 2010/0140034 A1 * | 6/2010 | Greenwood | F16H 15/38 192/3.57 |
| 2012/0040794 A1 | 2/2012 | Schoolcraft | |
| 2014/0349806 A1 | 11/2014 | DeFreitas et al. | |
| 2014/0378272 A1 | 12/2014 | DeFreitas et al. | |
| 2015/0011357 A1 | 1/2015 | DeFreitas et al. | |

FOREIGN PATENT DOCUMENTS

| | | |
|---|---|---|
| WO | 2008/102167 A1 | 8/2008 |
| WO | 2010/073036 | 7/2010 |
| WO | 2013/110920 A9 | 8/2013 |

OTHER PUBLICATIONS

International Search Report, Application No. PCT/EP2013/066738 dated Oct. 16, 2013.
UK Search Report, Application No. GB1214316,0 dated Nov. 30, 2012.
Potentially related application, U.S. Appl. No. 14/371,582, filed Jul. 10, 2014, Publication No. US-2014-0349806-A1, Publication date Nov. 27, 2014.
Potentially related application, U.S. Appl. No. 14/371,570, filed Jul. 10, 2014, Publication No. US-2014-0378272-A1, Publication date Dec. 25, 2014.
Potentially related application, U.S. Appl. No. 14/373,963, filed Jul. 23, 2014, Publication No. US-2015-0011357-A1, Publication date Jan. 8, 2015.
Potentially related application, U.S. Appl. No. 14/373,970, filed Jul. 23, 2014, published as WO2013/110920, dated, Aug. 1, 2013.

* cited by examiner

INFINITELY-VARIABLE TRANSMISSION FOR A VEHICLE

This invention relates to an infinitely-variable transmission (IVT) for a vehicle. It has particular, but not exclusive, application to vehicles that must frequently reverse their direction of drive and have an efficient launch characteristic in both forward and reverse directions, a characteristic of loading vehicles, such as a back-hoe loader, wheel loader or a fork-lift.

A back-hoe loader requires a transmission that has drive characteristics that are quite unusual. During loading operations, the direction of drive is changed frequently, and high torque must be delivered to the drive wheels in either direction while the vehicle is stationary or near-stationary. Loading operations typically take place at low speed. However, the transmission must also provide a high-speed drive (which need be in one direction only) to allow the vehicle to be moved from place to place, for example on a public road.

A transmission for such a vehicle can be successfully implemented using a transmission that drives through a torque converter and a multi-speed gearbox. Typically, the multi-speed gearbox has a plurality of forward and reverse speeds. However, at low speeds (where the transmission will operate for much of the time) this type of transmission suffers from the significant disadvantage that the torque converter cannot be locked up, and so will cause significant power losses, with the result that the fuel consumption of a vehicle equipped with such a transmission is high.

An aim of this invention is to provide a transmission system that provides drive characteristics that provide a low-speed, high torque drive in forward and reverse directions without the with power losses associated with existing drives that incorporate a torque converter.

To this end, from a first aspect, this invention provides a transmission system comprising an input shaft and an output shaft, the transmission being operative to transmit rotational drive between the input and the output shaft, the transmission including a variator that can transmit drive at a continuously variable ratio between a minimum variator ratio and a maximum variator ratio, which transmission can operate a low-speed regime and in a high-speed forward regime, the transmission:

operative in the low-speed regime, at a neutral low regime variator ratio, the transmission is in geared neutral, in which, the output of the transmission is stationary irrespective of the speed of the input of the transmission and at a maximum low regime variator ratio, being greater than the neutral low regime variator ratio, the output of the transmission is driven from the input of the transmission at a maximum low-regime transmission ratio; and operative in the high-speed regime, at a minimum high regime variator ratio, the output of the transmission is driven from the input of the transmission at a minimum high-regime ratio and at a maximum high regime variator ratio, being greater than the minimum high-regime ratio, the output of the transmission is driven from the input of the transmission at a maximum high-regime transmission ratio, being greater than the minimum high regime transmission ratio.

Optionally, it is operable at a transmission ratio higher than the maximum low-regime transmission ratio only in the high-speed regime.

In the above statement, and throughout this specification, "geared neutral" is a condition in which the output of the transmission is stationary irrespective of the speed of the input of the transmission, this being achieved by suitable gearing, that causes two rotational speeds to be combined in a (typically epicyclic) gearset to create a stationary output. The "transmission ratio" is the ratio of the speed of the output of the transmission system to the speed of the input of the transmission system (the input being connected to an engine). The "variator ratio" is the ratio of the speed of the output to the speed of the input of the variator, where the variator is connected to the engine. When a ratio is described using words such as "high", "maximum", "low", "minimum" or others that describe the value of the ratio, this should be taken to mean the absolute value of the ratio, ignoring the sign of its value, unless otherwise stated.

It will be clear that the variator must be swept from the maximum low regime variator ratio to the minimum high regime variator ratio during the transition from the low-speed to the high-speed regime, and during the time that the transition is taking place, drive cannot be passed from the input to the output of the transmission without clutch slip and associated power loss and wear. This is normally considered to be a disadvantage that would negate some of the benefits of a continuously-variable transmission. However, in arriving at the present invention, it was realised that for some applications, a regime change need not be synchronous, provided that it does not take place when continuous torque delivery is required, as during loading operation, and that the removal of the requirement for a synchronous regime change could be advantageous in its effect on various aspects of the design of the transmission.

This is in contrast to a conventional CVT with a synchronous regime shift, in which the variator ratio sweeps in opposite directions in the two regimes to achieve the same sense of change in the transmission ratio. For example, in a low regime, an increase in the variator ratio will cause a decrease in the transmission ratio, while in a high regime, an increase in the variator ratio will cause an increase in the transmission ratio. Such a transmission can be configured such that there is no change in the variator ratio or the transmission ratio as a result of the regime change, which allows drive through the transmission to be maintained during the regime change.

A transmission embodying the invention does not suffer from the power losses associated with a torque convertor, so can give performance equal to that obtained from a conventional transmission, but with reduced fuel consumption so reducing operating costs. A lower-powered engine might also be used without loss of performance, so saving on costs in the manufacture of a vehicle and contributing to further gains in fuel efficiency.

Typically, the maximum low-regime transmission ratio is substantially equal to or greater than the minimum high-regime transmission ratio. In this way, despite the regime change not being synchronous, there is no step change in the transmission ratio when regime change occurs.

A transmission embodying the invention typically comprises an epicyclic gear set. In the low-speed regime (and typically, the low-speed regime only), the epicyclic gearset is operative to reduce the transmission ratio and thereby provide a stationary, geared neutral output when the variator is at the neutral low regime variator ratio and the transmission is in the low-speed regime. Typically, such a transmission includes a low-speed clutch that is engaged during operation in the low-speed regime to operatively couple the epicyclic gearset to the variator and that is disengaged in the high-speed regime to operatively decouple the epicyclic gearset from the variator. Typically, such a transmission typically further includes a high-speed clutch that is engaged during operation in the high-speed regime to couple the output of the variator to the output of the transmission, and that is disengaged during operation in the low-speed regime to decouple the output of the variator from the output of the transmission.

As is known in transmissions of this type, reversal of the direction of the output can be achieved in the low-speed regime by sweeping the variator through the neutral low regime variator ratio to a lower variator ratio. This has the advantage of providing a seamless change in drive direction. However, in embodiments of this invention, it may be preferable to provide reversal of the direction of operation by selectively connecting or disconnecting a gearset into the drive path through the transmission. This can reduce the required spread of the variator ratio to achieve the required overall spread of the transmission ratio, with consequential benefits of reduced power losses and gains in durability.

In embodiments of the invention, in the high-speed regime, all power (subject to losses) passing through the transmission passes through the variator. Alternatively, in the high-speed regime, part of the power passing through the transmission bypasses the variator.

The variator may be ratio-controlled (that is, the variator ratio is controlled directly by an external control system) but is preferably torque-controlled (that is, the variator ratio changes in response to the torque on the input and the output of the transmission).

A variator typically operates in a volume of traction fluid, which has well-understood viscosity properties that make it suitable for that transmitting drive within the variator. The variator other components of the transmission system may operate in a common volume of traction fluid. Alternatively, other components of the transmission system may operate in a separate volume of gear oil. This may be advantageous because of the relatively lower cost of gear oil as compared with traction fluid.

A variator for use in the present invention may be selected from known variators of substantially any configuration that are capable of providing the required variator ratio spread and torque capacity to meet the requirements of any particular embodiment of the invention. However, advantage may be gained by selection of a particular type of variator. While embodiments are described with reference to toroidal variators, and in particular to full-toroidal variators, other arrangements, such as semi-toroidal variators, friction cone variators, push belt variators, to name but a few, might also be used. However, in some circumstances, a specific choice of variator may be advantageous.

Most typically, the variator in an embodiment of the invention is a full-toroidal variator. The full-toroidal variator may, for example, comprise a two-cavity variator comprising a first driving surface and a first driven surface defining a first toroidal cavity and being coaxially mounted for rotation about a variator axis, a first plurality of rollers in driving engagement with the first driving and first driven surfaces; a second driving surface and a second driven surface defining a second toroidal cavity and being coaxially mounted for rotation about the variator axis and a second plurality of rollers in driving engagement with the second driving and second driven surfaces; and a control assembly on which the rollers in the first cavity and the rollers in the second cavity are rotatably mounted and which assembly is adapted to balance the reaction torque from the first cavity with the reaction torque from the second cavity.

A full-toroidal variator in embodiments of the invention may comprise a driving surface mounted for rotation on an input shaft defining a variator axis and a driven surface coaxially mounted for rotation with the driving surface, the surfaces defining a toroidal cavity and two rollers in the or each toroidal cavity in driving engagement with the driving and driven surfaces, a take-off drive operatively engaged with the driven surface and disposed radially of the variator axis whereby a radial contact force perpendicular to and intersecting the variator axis is generated and wherein the rollers are located such that the points of contact of the rollers with the driving and driven surfaces at one particular ratio within the operating range of the variator generally lie in a plane which is substantially perpendicular to the direction of the contact force.

A full-toroidal variator in embodiments of the invention may comprise a driving and a driven disc having a variator axis, a plurality of pairs of contacting rollers interposed between said discs and the discs being urged into contact by an applied end-load force, each of the rollers having a first rolling surface by which it contacts the other roller of the pair and a second rolling surface by which each roller contacts the toroidal surface of the corresponding disc, each roller is mounted on a supporting axle about which it can rotate; the rotational axes of the rollers in a pair are supported in a plane or planes that contain the two points where the rollers of the pair contact the discs; at least one of the rollers in each pair is adapted to be moved to adopt a stable position within said plane by the reactionary force exerted on it by the other roller of the pair.

From a second aspect, this invention provides a vehicle that includes a transmission system embodying the first aspect of the invention. This aspect of invention has particular, but not exclusive, advantages when the vehicle is a loading vehicle, such as a backhoe loader, a wheel loader or a fork lift.

An embodiment of the invention will now be described in detail, by way of example, and with reference to the accompanying drawings, in which.

Figure 1:
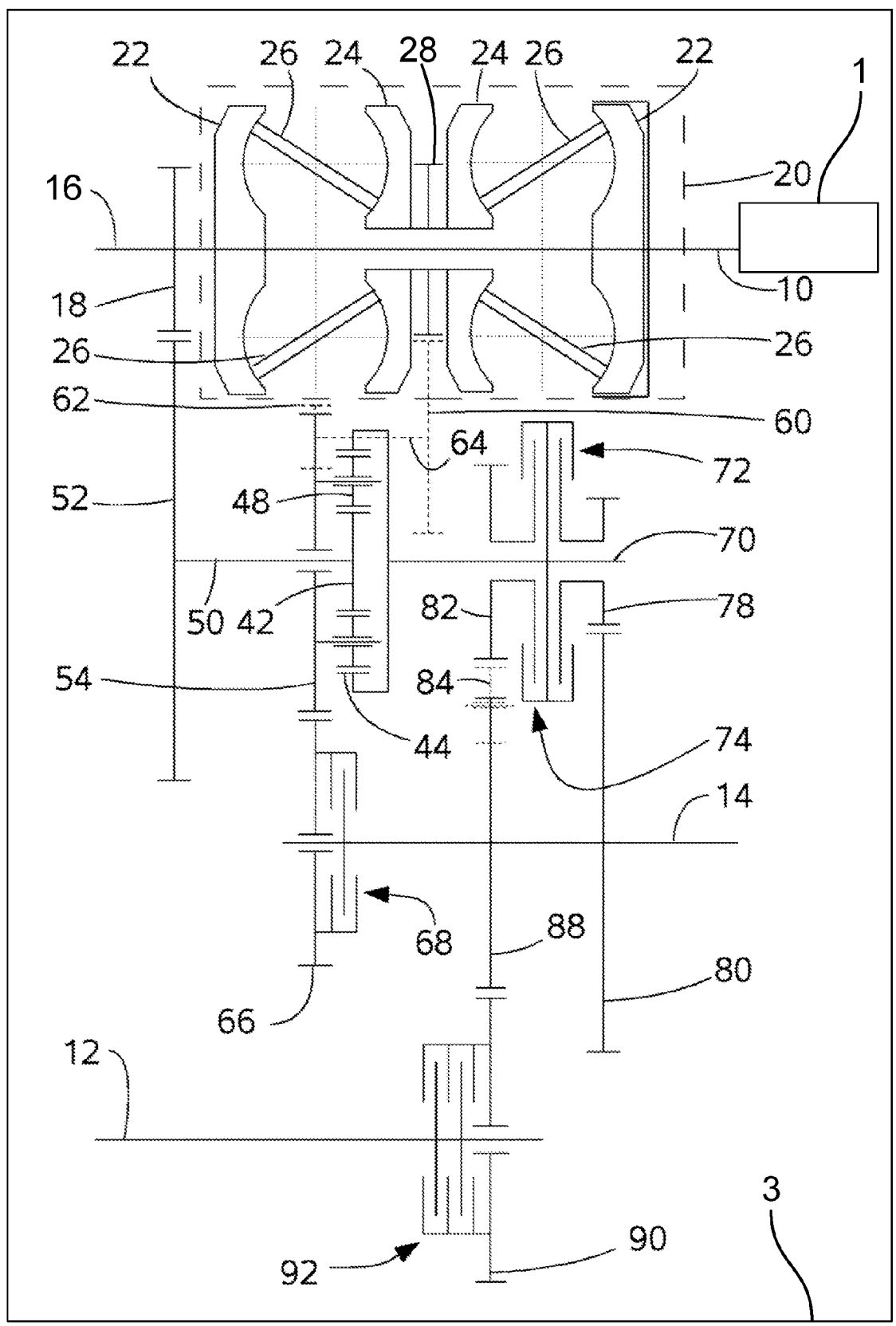
FIG. 1 is a diagrammatic representation of a transmission system being a first embodiment of the invention.
Figure 2:
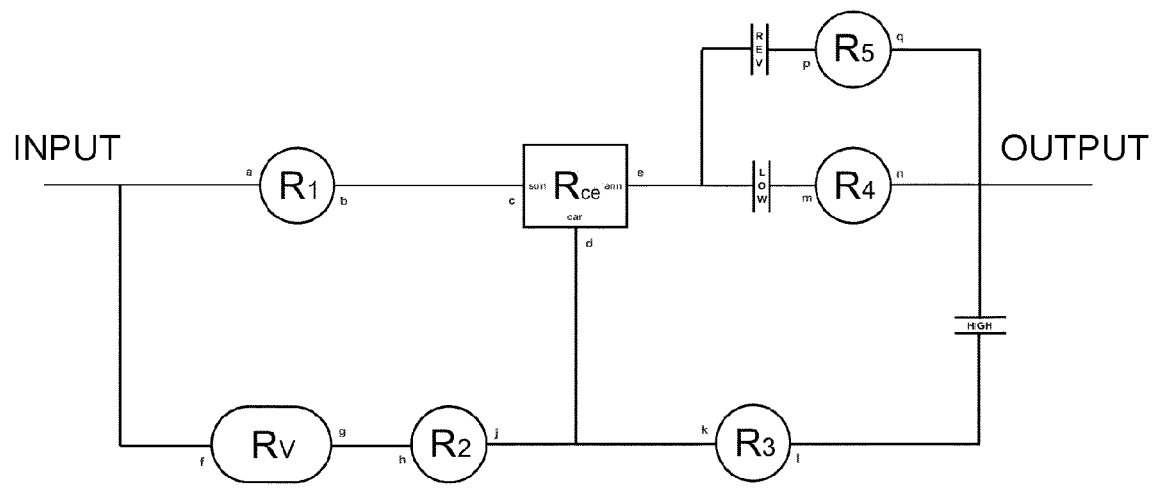
FIG. 2 is a diagrammatic representation of the scheme of the transmission of FIG. 1.
Figure 3:
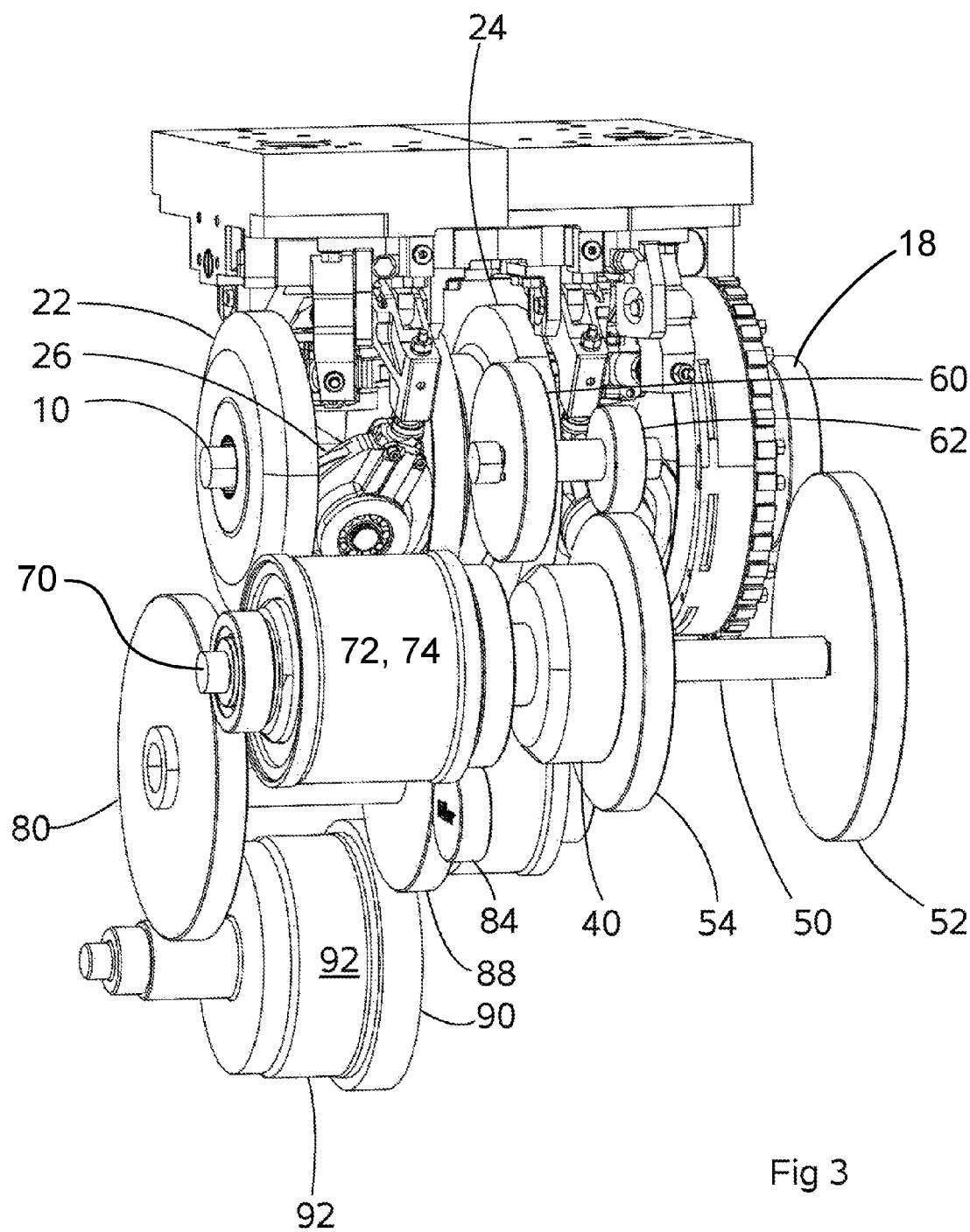
FIG. 3 is a view of the layout of the components of the transmission of FIG. 1.

With reference to FIGS. 1 to 3, a transmission system comprises an input shaft 10 that is connected for use to an output shaft of an engine 1 of a vehicle 3 such as a backhoe loader, a wheel loader or a fork lift. A front output shaft 12 is connected for use to a final drive unit at the front of a vehicle, and a rear output shaft 14 is connected for use to a final drive unit at the front of a vehicle. An auxiliary output shaft 16 is driven directly from the input shaft 10. The auxiliary output shaft 16 is used to drive ancillary components of the vehicle, such as hydraulic pump. A first spur gear 18 is carried on the input shaft 10.

The transmission system includes a full-toroidal variator 20. This is of known construction, so only its main components will be described briefly here. The variator includes two input discs 22 and two output discs 24, each having a part-toroidal recess, whereby a toroidal cavity is formed between each input disc 22 and each output disc 24. All discs have a common rotational axis, which, in this embodiment, is coaxial with the input shaft 10, which is coupled for rotation with the input discs 22. Each cavity contains a set of rollers 26 that can transmit drive between the input discs 22 and the output discs 24 through a medium of traction fluid. The ratio $R_v$ of the speeds of the input discs 22 and the output discs 24 is dependent upon the angle of tilt of the rollers 26 with respect to the discs 22, 24. An output gear 28 is provided between the output discs 24 and is fixed for rotation with them.

The transmission system further includes an epicyclic gearset 40, which, as is conventional, includes a sun wheel 42, an annulus 44, and a planet carrier on which is carried a plurality of planet wheels 48. The sun wheel 42 is fixed for rotation with a sun wheel shaft 50. Also fixed on the sun wheel shaft 50 is a second spur gear 52, the second spur gear 52 being in mesh with the first spur gear 18, with a ratio $R_1$. A planet gear 54 is carried on, and fixed for rotation with, the planet carrier. The ratio of the speed of the sun wheel 42 to the planet carrier will be denoted $R_{ce}$.

Third and fourth spur gears 60, 62 are carried on and fixed for rotation with a first intermediate shaft 64. The third spur gear 60 is in mesh with the output gear 28 of the variator 20 with a ratio $R_2$, and the fourth spur gear 62 is in mesh with the planet gear 54.

The planet gear 54 drives an input gear 66 of a high-regime clutch 68 with a ratio $R_3$ The high-regime clutch 68 can selectively connect or disconnect drive from its input gear 66 to the rear output shaft 14.

The annulus is connected to drive a second intermediate shaft 70. The second intermediate shaft 70 drives an input to a low-regime clutch 72 and a reverse clutch 74. The low-regime clutch 72 can selectively connect or disconnect drive from the second intermediate shaft 70 to a low-regime output gear 78. The low-regime output gear 78 is in mesh with a fifth spur gear 80, with a ratio $R_4$, that is carried on and fixed for rotation with the rear output shaft 14. The reverse clutch 74 can selectively connect or disconnect drive from the second intermediate shaft 70 to a reverse intermediate gear 82, which is connected through an idler gear 84 to a sixth spur gear 88, with an overall ratio $R_5$ that is carried on and fixed for rotation with the rear output shaft 14.

The sixth spur gear 88 drives an input gear 90 to a front-drive clutch 92. The front-drive clutch 92 can selectively connect or disconnect drive from its input gear 90 to the front output shaft 12.

The transmission can operate in three regimes: low-speed forward, reverse, and high-speed forward. Operation of the transmission in these three regimes will now be described.

At all times, the sun wheel 42 is driven by the input shaft 10 through the first and second spur gears 18, 52 in the opposite direction to the input shaft 10. The first and second spur gears 18, 52 provide a reduction ratio between the input shaft 10 and the sun wheel 42. At all times, the planet carrier is driven from the output of the variator through the third and fourth spur gears 60, 62, and the planet gear 54 in the opposite direction to the input shaft 10. In this mode, the output speed na of the epicyclic gearset is given by:

$$n_a = n_p\left[1 - \left(\frac{n_s}{n_p} - 1\right)\frac{z_s}{z_a}\right], \tag{1}$$

where np and ns are, respectively, the input speeds of the planet carrier and the sun wheel 42, and za and zs are, respectively, the number of teeth on the annulus 44 and the sun wheel 42.

In the low-speed forward regime, the low-regime clutch 72 is engaged, and the reverse clutch 74 and the high-regime clutch 68 are disengaged. The output shaft 14 is driven by the annulus 44 through the low-regime clutch 72, the low-regime output gear 78 and the fifth spur gear.

In the low-speed forward regime, when the variator 20 is set to a neutral variator ratio (which may or may not be its lowest ratio), the output of the transmission as a whole is stationary—that is, it is in geared neutral. It will be seen from equation (1) above that:

$$n_a = 0 \Leftarrow \frac{n_s}{n_p} = \frac{z_a}{z_s} + 1 \tag{2}$$

Therefore, geared neutral is achieved by suitable selection of the ratios of the first and second spur gears 18, 52; the ratios of the third and fourth spur gears 60, 62 and the planet gear 54; and the minimum ratio of the variator 20 to satisfy equation 2.

Assume now that the variator ratio 20 is increased. This results in a linear increase in the value of np, with the transmission ratio and the rate of increase being determined by the value of za/zs. In the low-speed forward regime, the transmission ratio of the transmission can be varied continuously as the variator 20 is moved from the ratio at which geared neutral is achieved (the neutral low regime variator ratio) through its entire ratio spread to the maximum low-regime variator ratio, at which the transmission ratio is $r_{low,max}$.

In the reverse regime, the reverse clutch 74 is engaged, and the low-regime clutch 72 and the high-regime clutch 68 are disengaged. The output shaft 10 is driven by the annulus 44 through the reverse clutch 74, the reverse intermediate gear 82, the idler gear 84 and the sixth spur gear 88. The idler gear 84 serves to reverse the direction of drive to the rear output shaft 14. In this example, the transmission ratio in reverse is higher than in the low-speed forward regime. This is achieved by selecting the intermediate gear 82 to be larger than the low-regime output gear 78.

In the high-speed forward regime, the high-regime clutch 68 is engaged, and the reverse clutch 74 and the low-regime clutch 72 are disengaged. The output shaft 14 is driven from the output of the variator 20 driving through the third and fourth spur gears 60, 62; the planet gear 54, the input gear 66 and the high-regime clutch 68. The annulus 44 is free to rotate, so the epicyclic gearset does not operate as part of the drive train in this regime. Thus, a change in the ratio of the variator 20 has a direct effect on the overall transmission ratio. The transmission ratio in the high-speed forward regime extends between $r_{high,min}$ and $r_{high,max}$.

Figure 4:
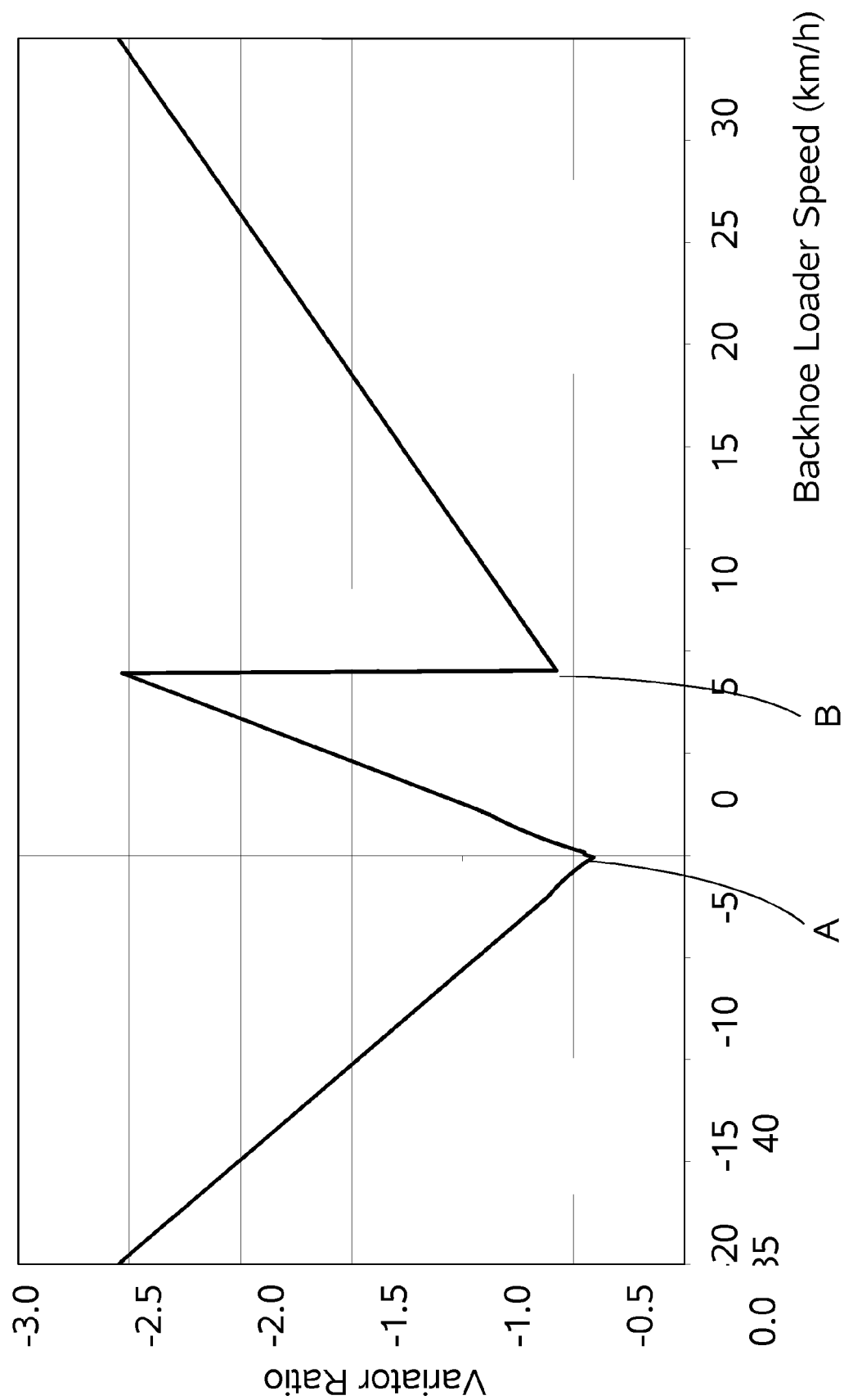
FIG. 4 is a graph that shows the relationship between variator ratio and vehicle speed of a vehicle equipped with the transmission of FIG. 1.

In order to change between the low-speed forward regime and the high-speed forward regime, drive must first be removed from the input shaft. The low-regime clutch 72 is then disengaged, and the variator 20 is swept back towards its low-ratio limit to a position in which the transmission will have a transmission ratio $r_{high,min}=r_{low,max}$. The high-regime clutch 68 is then engaged and power can once again be applied to the input shaft 10. The relationship between engine speed and road speed in the three operating regimes is illustrated in FIG. 4.

The transmission can be operated in a two-wheel drive mode or a four-wheel drive mode by disengaging or engaging the front-drive clutch 92.

Inherent in the nature of the invention is that the variator ratio has to be 'reset' at the regime change point. Therefore, an option open to the designer of an embodiment of the invention is to extend the low regime and then not use the whole of the variator ratio spread in high-speed forward regime.

There will be a momentary break in the torque delivery to the wheels at the low-to-high regime change point while the variator ratio is being reset. For this reason it is considered desirable to ensure that the regime change will not occur during operating conditions in which continuous torque delivery is required. For example, in a transmission for a loading vehicle such as a backhoe loader or a wheel loader, it is desirable that the regime change take place at a speed greater than that at which loading operations will take place. This might typically be around 9 to 12 km/h, which corresponds to speeds achieved in $2^{nd}$ gear of a conventional multi-speed torque converter transmission.

Immediately following the change into the high-speed regime, the end discs 22 of the variator 20 are subject to their highest levels of contact stress as the variator ratio 20 is at a minimum and the precession angle of the rollers 26 at its highest. Time spent at this condition could have a significant detrimental impact on durability of the variator 20. If the spread of the variator ratio (and hence the transmission ratio spread) in the high-speed regime is reduced, while still having the maximum speed/transmission ratio at the maximum variator ratio, then this area of peak stress can be avoided.

For example, taking the regime change to be at 9.0 km/h (from above) the variator ratio/transmission ratio spread in high-speed regime would be 40/9=4.44. If the variator ratio spread in the low-speed regime is 6.5 and is symmetrical around the 1:1 position, then the variator ratio capabilities are −0.39 to −2.55 (note that the negative sign simply indicates that the variator input and output rotate in opposite directions). Following the change into the high-speed regime, instead of resetting the variator ratio to −0.39 it need only be reset to −0.57 (i.e. −2.55/4.44). This is apparent from FIG. 4, in which the absolute value of the variator ratio at geared neutral (at A) is somewhat less than at the transition to the high-speed forward regime (at B).

In order to operate, the full-toroidal variator of this embodiment must be provided with a volume of traction fluid. While this can also be used to lubricate other components in the transmission, this is disadvantageous since traction fluid may be more expensive than conventional gear oil. Therefore, the present embodiment is constructed such that only the variator 20 operates in traction fluid, with the remaining components being separate and operating in conventional gear oil. This ensures that the amount of traction fluid required for operation of the transmission is minimised, which is advantageous in that it minimises cost. In addition, the efficiency with which gears operate in gear oil may be slightly better in gear oil than in traction fluid.

Figure 5:
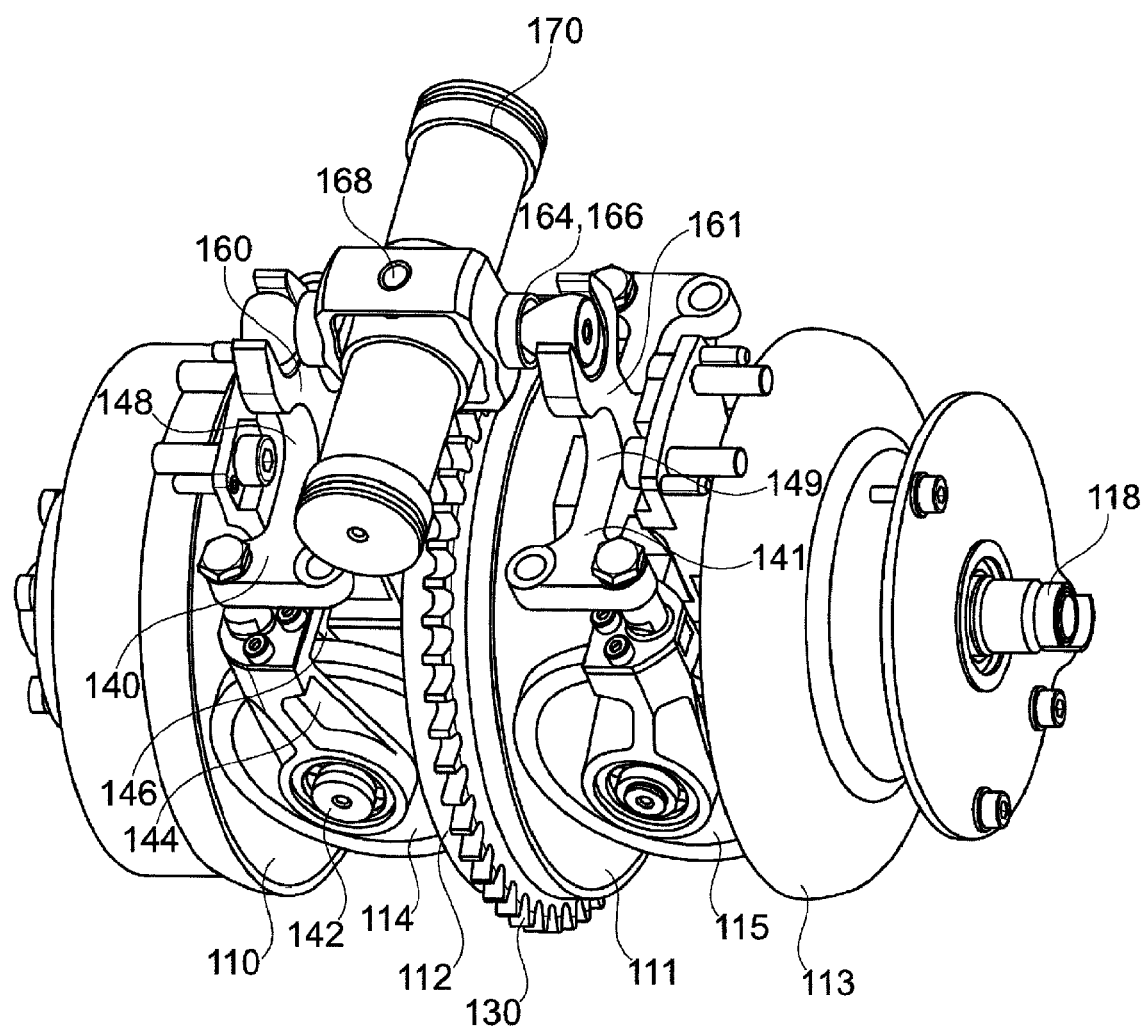
FIG. 5 is a perspective view of a two-cavity variator suitable for use in the transmission system being part of the embodiment of FIGS. 1 to 3.

FIG. 5 shows a two-cavity full-toroidal variator suitable for use in embodiments of the invention. The variator has a first toroidally-recessed driving disc 110, facing which is a first toroidally recessed (the recess not being shown) driven disc 112. A first toroidal cavity is defined between the opposing toroidally-recessed faces of the driving and driven discs 110, 112. The driven disc 112 also has a second toroidal recess 111 on its opposite side providing a second toroidally recessed driven surface. A second toroidally-recessed driving disc 113 is provided, defining a second toroidal cavity with the second driven surface 111. Each of the discs 110, 112, 113 is located on a common axis, which will be referred to as the variator axis. The input shaft 10 is coaxial with the variator axis. Each of the driving discs 110, 113 is fixed to the input shaft 10 for rotation with it. The driven disc 112 is carried for rotation on the input shaft 10.

A first roller 114 and a second roller (hidden in FIG. 5) are mounted in the first toroidal cavity to transmit drive from the driving disc 110 to the driven disc 112 with a variator ratio which varies as the first roller 114 and the second roller tilt. A third roller 115 and a fourth roller (hidden in FIG. 5) are mounted in the second toroidal cavity to transmit drive from the driving disc 111 to the driven disc 113 with a ratio which is variable by tilting the third roller 115 and the fourth roller.

The first roller 114 and the second roller are rotatably mounted in a first roller carrier 140. The first roller carrier 140 comprises a first roller carriage 144, 146 for the first roller 114 and a second roller carriage for the second roller. A second roller carrier 141 comprises similar roller carriages for the third roller 115 and the fourth roller. The first, second, third and fourth rollers are each mounted by means of a respective stub axle 142 that is rotatably mounted in a respective roller carriage, each being defined by opposed planar support plates 144, 146. The mounting of the rollers is numbered only on one roller for illustrative purposes and in the interests of clarity. The first, second, third and fourth rollers are mounted on the carriers 140, 141 via spherical bearings to provide the required degrees of freedom of movement. The first roller carrier 140 carries the first roller 114 and the second roller, and the second roller carrier 141 carries the third roller 115 and the fourth roller.

Each roller carrier 140, 141 comprises a respective cross-bar 148, 149 which links the two roller carriages within the roller carrier 140, 141. Each roller carriage is mounted on the cross bar 148, 149 such that it can pivot with respect to the cross bar about an axis that is normal to both the variator axis and to the axis of rotation of the stub axle 142—that is to say, tangential to the discs 110, 112, 113. Each cross-bar is pivotally mounted, the pivot axis being parallel to the variator axis and normal to the axis of rotation of the rollers.

Each cross-bar 148, 149 is provided with an actuating arm 160, 161 which projects in a radial direction from the variator axis in a direction generally parallel to the axis of rotation on the associated roller carriages on the cross-bars 148, 149. End portions of the arms 160, 161 project out of a variator housing are have recess that is C-shaped, when viewed along the variator axis, for direct mechanical engagement with a control linkage.

The control linkage 164 comprises a linking lever 166 mounted to pivot on a pivot bearing 168 about an axis that is normal to and intersects the variator axis. The pivot bearing 168 is carried on an output element of an actuator 170. End portions of the linking lever 166, to opposite sides of its pivot axis are each received in the recess of a respective one of the arms 160, 161, whereby the linking lever 166 is operatively linked to the carriers 140, 141. These end portions are part-spherical in shape to enable them to move smoothly within the recesses. Thus, as the linking lever 166 rotates about its pivot bearing 168, the arms 160, 161 move the arms 160, 161 in opposite directions in respective plane perpendicular to the variator axis. Rotation of the linking lever 166 will cease when the forces applied to it be the arms 160, 161 are equal in magnitude and opposite in direction.

The actuator 170 is a dual-acting hydraulic actuator in this embodiment. Its output element can be caused to move in a direction tangential to the discs 110, 112, 113, carrying the linking lever 166 with it.

During operation of the variator, when the actuator 170 moves from a central position (in which the discs are rotating about an axis that is normal to the variator axis) its force is balanced by a reaction torque that acts on the first, second, third and fourth rollers about the variator axis. The torque on the first roller 114 and the second roller is in a direction opposite to that on the third roller 115 and the forth roller. Therefore, the forces on the opposite end portions of the linking lever 166 act in opposite directions. As has been discussed, the linking lever 166 will rotate until such forces are balanced, which implies that the reaction torque from one cavity will also be balanced by the reaction torque from the other cavity.

The driven disc 112 is provided with teeth 130 on its circumference to form a spur gear, whereby drive may be taken through the third spur gear 60. A gear force Fg is generated which may impart a bending force to the driving shaft and cause the more distant parts of the driving surfaces 110, 113 to bow or splay away from the driven surfaces 112, 111.

Figure 6:
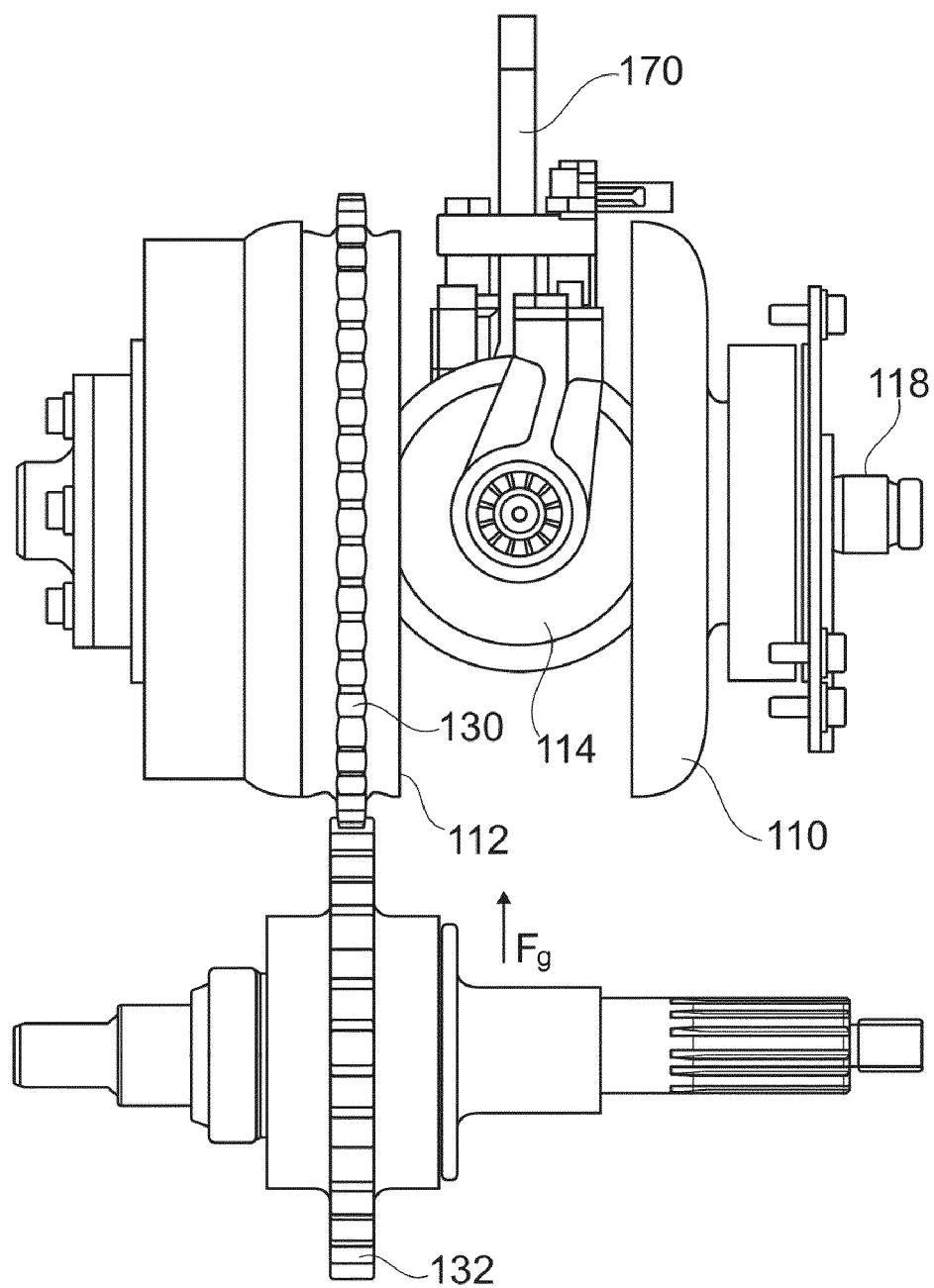
FIG. 6 is a side view of a single-cavity variator suitable for use in the transmission system being part of the embodiment of FIGS. 1 to 3.

FIG. 6 shows a further variator suitable for use in embodiments of the invention. In this embodiment, the variator has a single cavity formed between a toroidally-recessed driving disc 110 and a facing toroidally recessed driven disc 112. The discs are coaxial and rotate about a variator axis. Two rollers 114, (only one shown) are mounted in the toroidal cavity defined between the opposing toroidally-recessed faces of the driving and driven discs 110, 112 to transmit drive from the driving disc 110 to the driven disc 112 with a ratio which is variable by tilting the rollers 114. The rollers rotate about a common axis that will be referred to as the roller axis. An input shaft 10 is coaxial with the variator axis. The driving disc 110 is fixed to the input shaft 10 for rotation with it. The driven disc 112 is carried for rotation on the input shaft 10.

The driven disc 112 is provided with teeth 130 on its circumference whereby drive is taken to the third spur gear 60. A gear force Fg is generated which imparts a bending moment to the input shaft 10, which causes the more distant parts of the driving surface of the driving disc 110 and the driven surface of the driven disc 112 to splay apart.

Each roller 114, contacts the driving disc 110 and driven disc 112 arranged in such a way that the force Fg is perpendicular to the two planes that pass through the roller-disc contact points when the variator is at a −1.0 ratio (that is, when the roller axis is perpendicular to the variator axis). This is achieved by ensuring that a line joining the axis of rotation of the third spur gear 60 and the variator axis is perpendicular to the roller axis.

With this orientation, for each disc 110, 112, the roller-disc contact points are located in a plane that passes through the neutral axis of bending of the variator. This means that the distance between the two contact points between each roller 114, and the discs 110, 112 is substantially invariant when the shaft 10 bends, and any such variation that does occur will affect each roller substantially equally. This means that the normal contact forces between the discs 110, 112 and the rollers 114, are not substantially affected by the radial force Fg and each roller contact bears an equal proportion of an applied end-load force.

The rollers 114 and may each be actuated by an actuator 170 or may both be actuated by a single actuation mechanism. Hydraulic actuators may be employed to provide ratio control. The variator is preferably torque-controlled.

Figure 7:
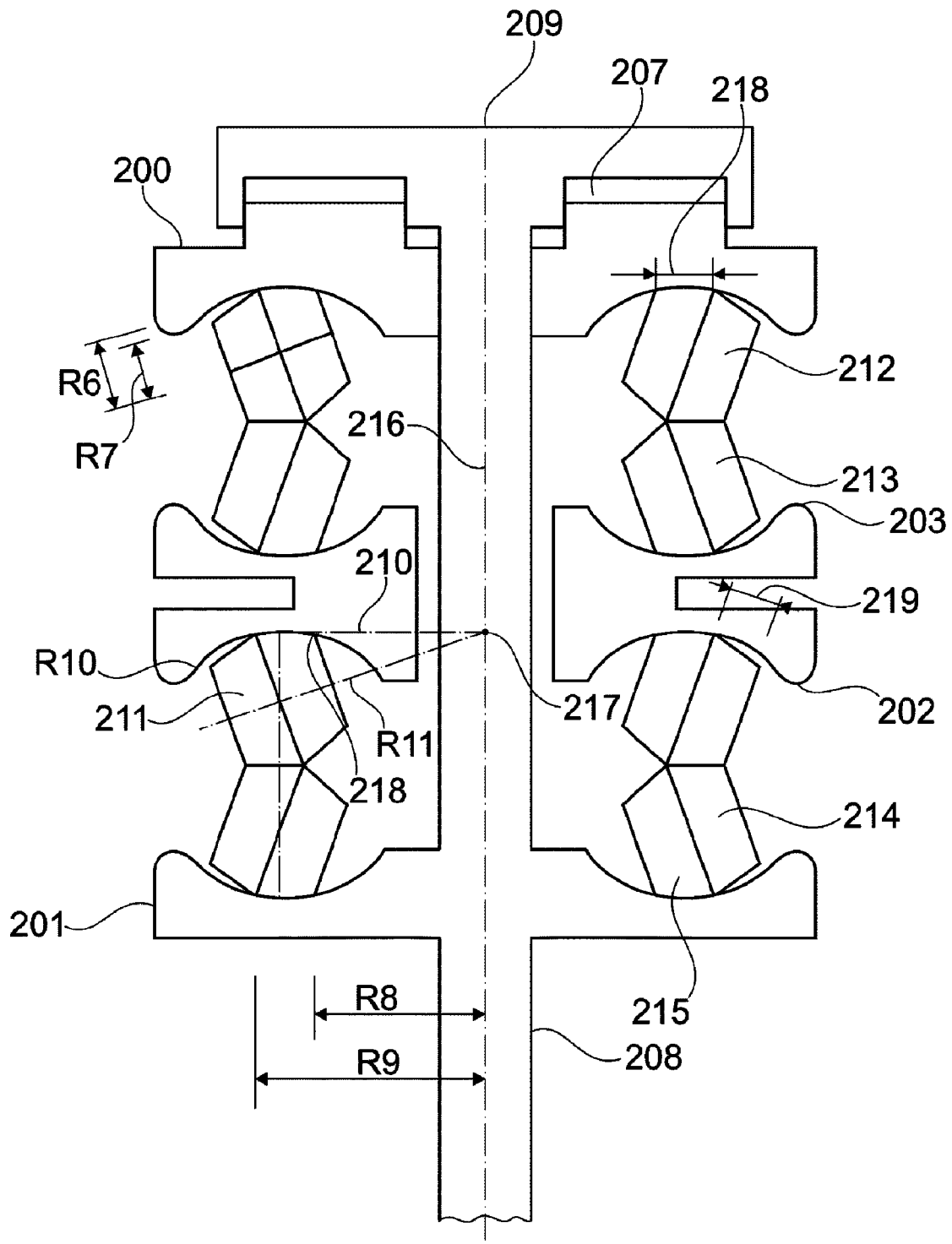
FIG. 7 is a diagrammatic sectional view of a two-cavity, twin roller variator suitable for use in the transmission system being part of the embodiment of FIGS. 1 to 3.
Figure 8:
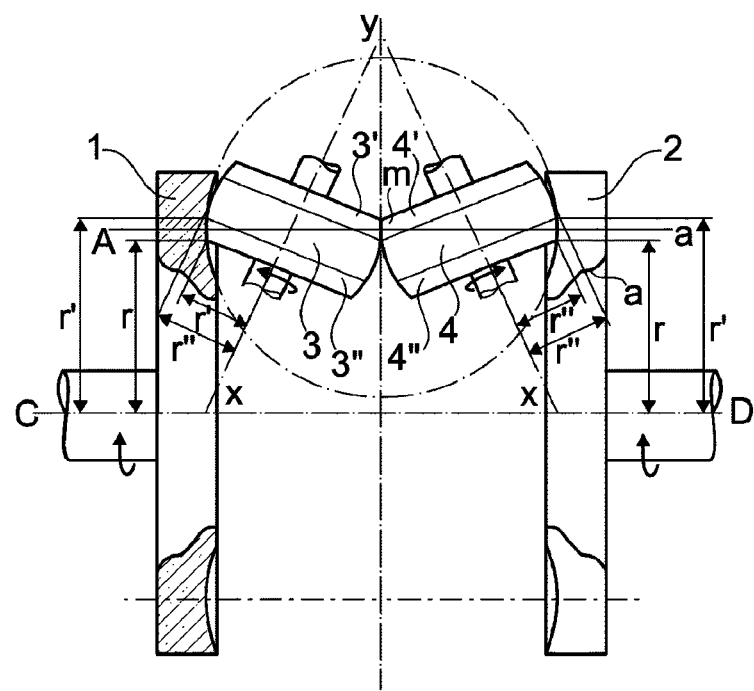
FIG. 8 is a schematic elevation, partly in section, of the variator of FIG. 7.

FIG. 7 shows diagrammatically a further variation on a two-cavity variator suitable for use in embodiments of the invention. As with the embodiment of FIG. 5, this variator has a driven disc 210, and first and second driving discs 201, 200. A first toroidal cavity is formed between the first driving disc 201 and the driven disc 210, and a second toroidal cavity is formed between the second driving disc 200 and the driven disc 210.

Instead of the disc-shaped rollers, that extend from the driving to the driven discs, present in the previous embodiments, this variator has several twin roller sets supported between driving and driven discs. In FIG. 7, one roller set includes first and second rollers 212 and 213, and three similar roller sets are also shown.

Each roller has an outer surface that has two distinct regions. A conical region that presents an external, generally frusto-conical rolling surface 214, and a spherical region that presents an external, generally part-spherical rolling surface 215. (Instead of being exactly frusto-conical, the conical region may be formed with a very large crown radius or with curved edges so as to reduce stress concentrations at the edges of the conical surface.)

Drive from the driving disc 201 is transmitted to the first roller 212 of the roller set, thence to the second roller 213 of the roller set, which then drives the driven disc 210. The rollers 212, 213 in the roller set are arranged such that only their spherical regions make contact with the discs and only their conical regions make contact with each other.

Within each roller set, the rollers are carried on a roller carrier that allows them to rotate about axes that have an angle fixed with respect to one another. The cone angle of the conical region, and the angle between the axis, is arranged such that, when clamped together along the variator axis by the discs 201, 200, 210, the rotational axes of all of the rollers lie within a plane that passes through the variator axis but run through the variator axis 216. The axes are displaced from each other under the influence only of the conical surfaces and the clamping reactions. The degree of displacement is such that in at least one position, each roller (not necessarily simultaneously) experiences a state where the differential velocities across the contacting surfaces is less than 0.5% and where the tangent of the disc and roller surface 210 at the centre of the point of contact, and the roller rotational axis 211, and the disc rotational axis 216 generally pass through the same point 217.

Figure 9:
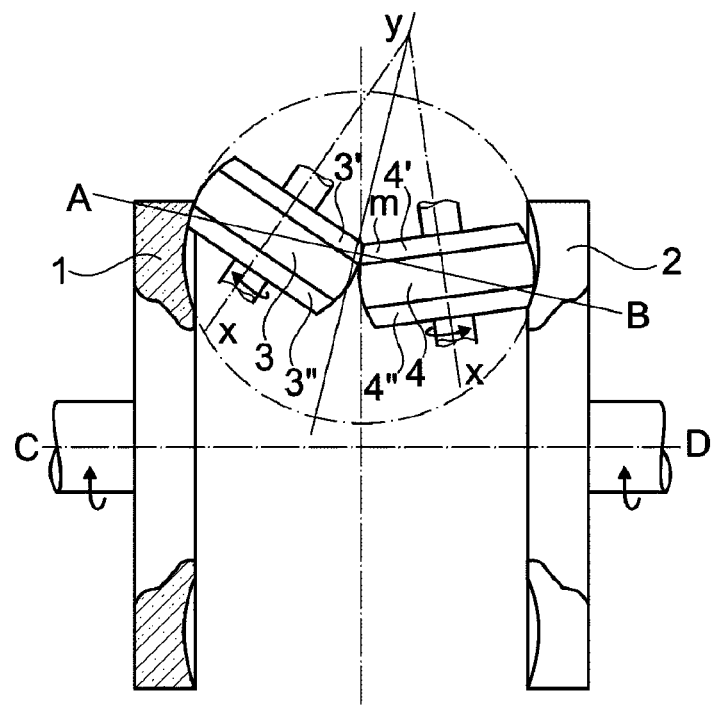
FIG. 9 is a view similar to that of FIG. 8, showing the rollers in another position.
Figure 10:
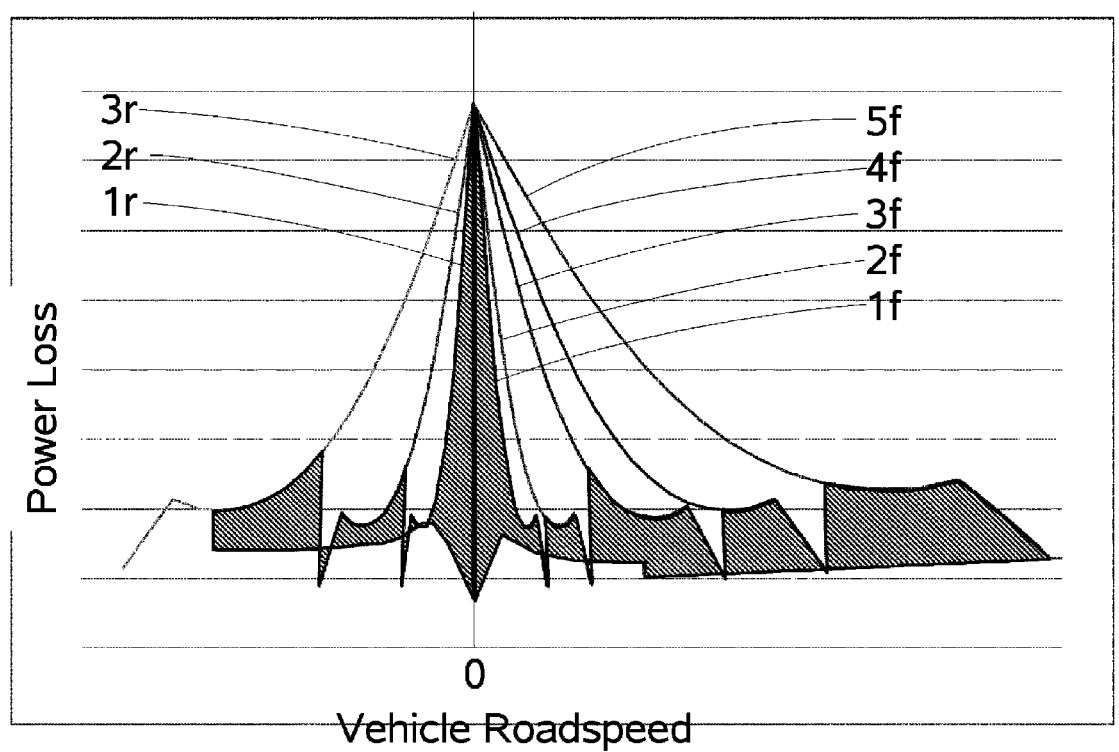
FIG. 10 is a graph that illustrates reduction in power losses that can be achieved through use of an embodiment of the invention in a loading vehicle.

The variator shown in FIGS. 9 and 10 has at least one pair of rollers. The rollers contact each other along a theoretical line the centre point of which is indicated by m, which line remains always perpendicular to the line AB passing through the centre-points of the contact lines of the two rollers and of each roller and its corresponding disc. The axes X_Y respectively of the two rollers of each pair always intersect or are concurrent and are always situated in a plane containing the variator axis CD of the driving and the driven discs.

As has been stated, it is an important aim of this invention to provide a transmission system for a vehicle that reduces power losses and thereby effects a saving in operating cost, as compared with a conventional transmission. FIG. 10 presents the predictions of a model for power losses of a conventional 5-forward/3-reverse step-change transmission driving through a torque converter, and a transmission embodying the present invention, as applied to a backhoe loader or a wheel loader. Vehicle roadspeed is on the x-axis and power loss on the y-axis in each gear. The traces labelled 1f to 5f are for the five forward speeds and the traces labelled 1r to 2r are for the three reverse speeds. The power loss for each individual speed in the conventional gearbox is plotted, as is the single-line plot that represents power loss using an embodiment of the invention.

In FIG. 10, the hatched area represents the difference in power loss between the two transmission systems. This suggests that the embodiment of the invention is capable of achieving significant reduction in power losses as compared with a conventional transmission system.

In the embodiments described above, the regimes operate with the variator in a direct mode. That is, all of the power flowing through the transmission passes through the variator. As is well-known to those skilled in the technical field, at least two alternative arrangements are possible within a transmission.

In a first alternative, which will be referred to as a "power split", only a portion the total power passes through the variator, with the remaining following a direct mechanical path from the input to the output of the transmission, bypassing the variator. In this arrangement, the epicyclic gearset is disposed between the input to the transmission and the variator.

In a second alternative, which will be referred to as "power recirculation", a portion the total power passes through the variator in a direction from the output to the input, with power in excess of the total passing through the transmission following a direct mechanical path from the input to the output of the transmission, bypassing the variator. In this arrangement, the epicyclic gearset is disposed between the output of the transmission and the variator.

It is contemplated that embodiments of the invention might use at least powersplitting or power recirculation in the high-speed regime. Suitably, the direction of flow of power through the direct mechanical path and the variator is in the same direction.

Figure 11:
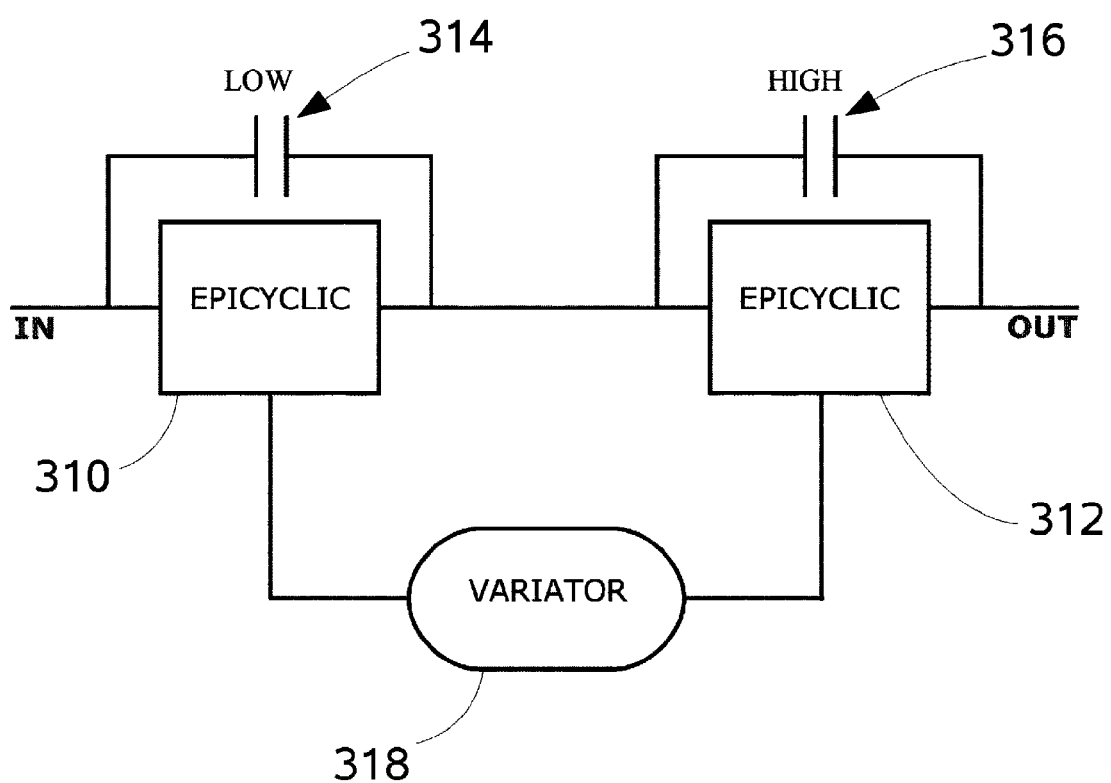
FIG. 11 shows schematically an alternative configuration of embodiments of the invention that employ power splitting between paths through the transmission that include and that bypass the variator.

One possible arrangement of a transmission that uses power splitting is shown in FIG. 11. This arrangement comprises a low-speed regime epicyclic gearset 310 and a high-speed regime epicyclic gearset 312, each having an associated clutch 314, 316 that can connect the input to the output of the associated epicyclic gearset. This arrangement provides an epicyclic gearset on the input to the transmission when it is operating in the high-speed regime.

What is claimed is:

1. A transmission comprising:
    an input shaft and an output shaft, the transmission being operative to transmit rotational drive between the input and the output shaft, the transmission including a variator that can transmit drive at a continuously variable ratio between a minimum variator ratio and a maximum variator ratio, which transmission can operate in a low-speed regime and in a high-speed forward regime, the transmission:
    being operative, in the low-speed regime, at a neutral low-speed regime variator ratio in which the output of the transmission is stationary irrespective of the speed of the input of the transmission, and at a maximum low-speed regime variator ratio, greater than the neutral low-speed regime variator ratio, in which the output of the transmission is driven in a forward direction from the input of the transmission at a maximum low-speed regime transmission ratio; and
    being operative, in the high-speed forward regime, at a minimum high-speed regime variator ratio in which the output of the transmission is driven in the forward direction from the input of the transmission at a minimum high-speed regime transmission ratio and at a maximum high-speed regime variator ratio, greater than the minimum high-speed regime variator ratio, in which the output of the transmission is driven in the forward direction from the input of the transmission at a maximum high-speed regime transmission ratio which is greater than the minimum high-speed regime transmission ratio; and
    wherein the change between the low-speed regime and the high-speed forward regime is not synchronous.

2. The transmission according to claim 1, in which the maximum low-speed regime transmission ratio is substantially equal to or greater than the minimum high-speed regime transmission ratio.

3. The transmission according to claim 1, further comprising an epicyclic gear set.

4. The transmission according to claim 3, that includes a low-speed clutch i) that is engaged during operation in the low-speed regime to operatively couple the epicyclic gearset to the variator and that is operatively disengaged in the high-speed forward regime to operatively decouple the epicyclic gearset from the variator or ii) that selectively connects or disconnects the epicyclic to the transmission output.

5. The transmission according to claim 1, that includes a high-speed clutch that is engaged during operation in the high-speed forward regime to couple the output of the variator to the output of the transmission, and that is disengaged during operation in the low-speed regime to decouple the output of the variator from the output of the transmission.

6. The transmission according to claim 1, further comprising a gearset that can be selectively connected into or disconnected from a drive path of the transmission at least in the low-speed regime, to cause the output of the transmission to be reversed.

7. The transmission according to claim 1, in which, in the high-speed forward regime, all power passing through the transmission passes through the variator.

8. The transmission according to claim 1, in which, in the high-speed forward regime, part of the power passing through the transmission bypasses the variator.

9. The transmission according to claim 1, in which the variator is torque-controlled.

10. The transmission according to claim 1, in which the variator operates in a volume of traction fluid, and other components of the transmission operate in a separate volume of gear oil.

11. The transmission according to claim 1, in which the variator and other components of the transmission operate in a common volume of traction fluid.

12. The transmission according to claim 1, in which the variator is a full toroidal variator.

13. A vehicle that includes a transmission wherein said transmission is a transmission according to claim 1.

14. The vehicle according to claim 13, that is operable to perform loading operations.

15. The vehicle according to claim 13, that is one of a backhoe loader, a wheel loader, or a fork lift.

16. The transmission according to claim 1, wherein the transmission is operative to allow a neutral transmission ratio to be achieved within the ratio spread of the variator in low-speed regime.

17. The transmission according to claim 1, in which the transmission is operable at a transmission ratio higher than the maximum low-speed regime transmission ratio only in the high-speed regime.

18. The transmission according to claim 3, wherein the epicyclic gear set is operative to allow a neutral transmission ratio to be achieved in low-speed regime.

19. The transmission according to claim 1 wherein a neutral transmission ratio is achievable only in the low-speed regime.

20. A loading vehicle that includes:
a transmission comprising an input shaft and an output shaft, the transmission being operative to transmit rotational drive between the input shaft and the output shaft, the transmission further including a variator that can transmit drive at a continuously variable ratio between a minimum variator ratio and a maximum variator ratio,
which transmission can operate, in a low-speed regime, at a neutral low-speed regime variator ratio in which the output of the transmission is stationary irrespective of the speed of the input of the transmission and at a maximum low-speed regime variator ratio, which is greater than the neutral low-speed regime variator ratio, in which the output of the transmission is driven from the input of the transmission at a maximum low-speed regime transmission ratio,
and in which the transmission ratio in the low-speed regime sweeps up as the variator ratio sweeps up to provide a low-speed, high torque drive in a forward direction.

21. The loading vehicle according to claim 20, in which the transmission, in the low-speed regime only, is operative to allow a geared neutral transmission ratio to be achieved within the ratio spread of the variator in low-speed regime.

22. The loading vehicle according to claim 20, which is a fork lift.

23. The loading vehicle according to claim 20, further comprising a gearset that can be selectively connected into or disconnected from a drive path of the transmission in its the low-speed regime, to cause the output of the transmission to be reversed.

* * * * *